United States Patent
Nowotka

(12) 
(10) Patent No.: US 9,127,742 B2
(45) Date of Patent: Sep. 8, 2015

(54) PROTECTIVE TUBE ARRANGEMENT FOR A PISTON-CYLINDER UNIT HAVING A PISTON ROD

(75) Inventor: Thomas Nowotka, Wonfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 630 days.

(21) Appl. No.: 13/558,401

(22) Filed: Jul. 26, 2012

(65) Prior Publication Data

US 2013/0025448 A1    Jan. 31, 2013

(30) Foreign Application Priority Data

Jul. 28, 2011  (DE) .......................... 10 2011 079 986

(51) Int. Cl.
 *F16J 10/02* (2006.01)
 *F16F 9/38* (2006.01)
 *F15B 15/14* (2006.01)

(52) U.S. Cl.
 CPC ............... *F16F 9/38* (2013.01); *F15B 15/1423* (2013.01); *Y10T 29/49249* (2015.01)

(58) Field of Classification Search
 CPC .... F15B 15/1423; F15B 15/1438; F16F 9/38; Y10T 29/4927; Y10T 29/49272; Y10T 29/49611
 USPC .................... 92/51, 169.1, 169.2; 29/888.061
 See application file for complete search history.

(56) References Cited

U.S. PATENT DOCUMENTS

| 4,167,991 A | 9/1979 | Karklins et al. |
| 4,199,855 A * | 4/1980 | McClellan ...................... 29/450 |
| 4,392,293 A * | 7/1983 | Yamaguchi et al. ............ 29/436 |
| 6,474,216 B2 * | 11/2002 | Heinz et al. ................. 92/169.1 |

FOREIGN PATENT DOCUMENTS

| DE | 1995281 U | 10/1966 |
| DE | 1951753 U | 12/1966 |
| DE | 7922720 U1 | 12/1979 |
| GB | 1083382 A | 9/1967 |
| JP | 2000088031 A | 3/2000 |

* cited by examiner

*Primary Examiner* — Michael Leslie
(74) *Attorney, Agent, or Firm* — Cozen O'Connor

(57) ABSTRACT

A protective tube arrangement for a piston-cylinder unit includes a substantially disk-shaped carrying cap and a protective tube which has axially projecting crenellations and free portions formed between the crenellations. First and second axially acting securing elements axially fix the protective tube to the carrying cap by positive engagement. Each of the securing elements is formed by a wrapped binding element which is wrapped around the protective tube over the crenellations and tightened between the crenellations over the free portions so that the binding element defines secant segments through the indentation of the imaginary contour of the protective tube between the crenellations in the free portions of the protective tube, which secant segments form a positively engaging arrangement for the carrying cap.

14 Claims, 5 Drawing Sheets

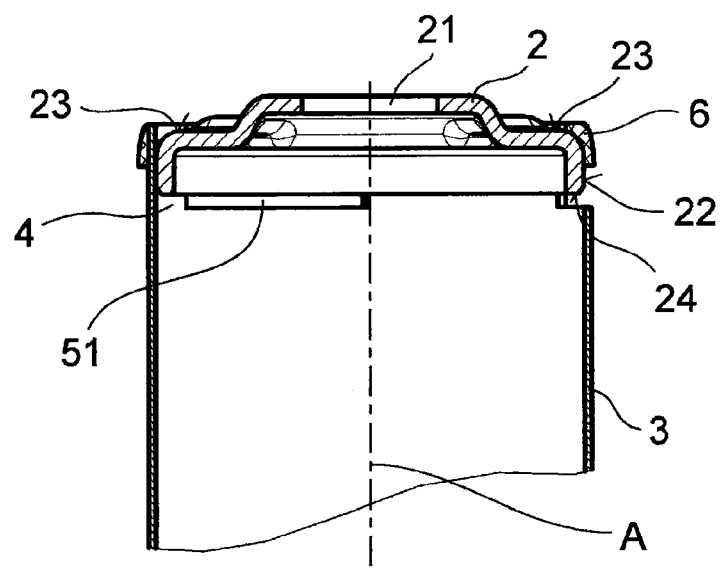
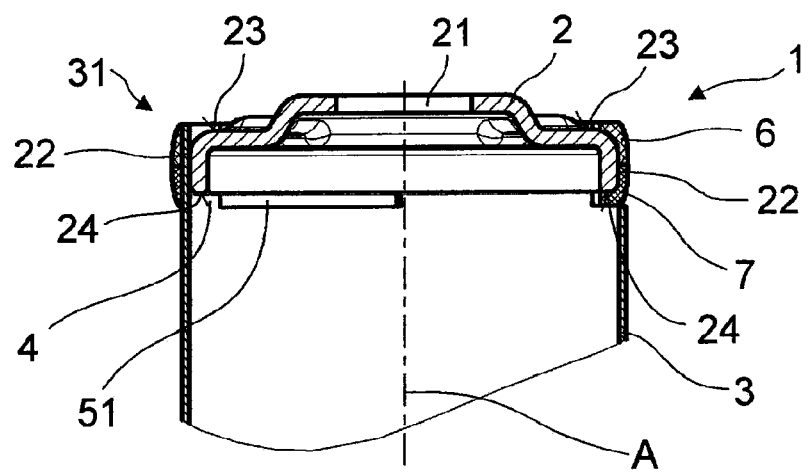

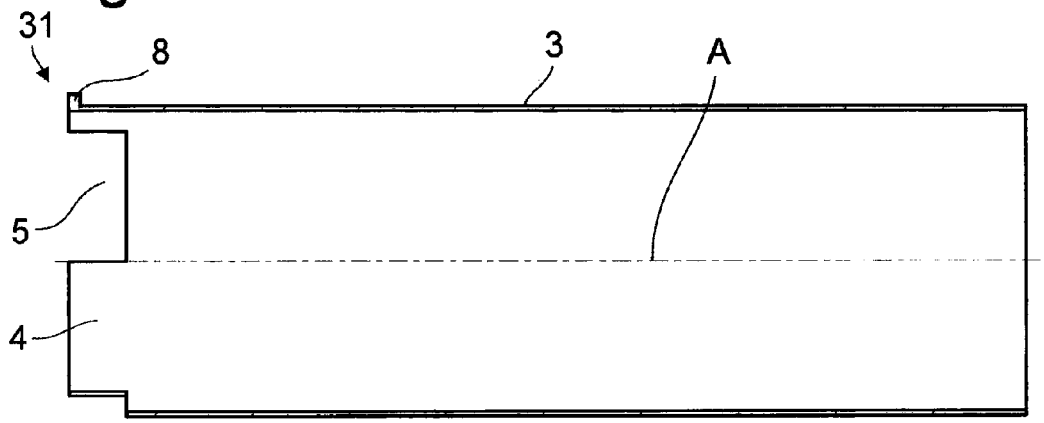
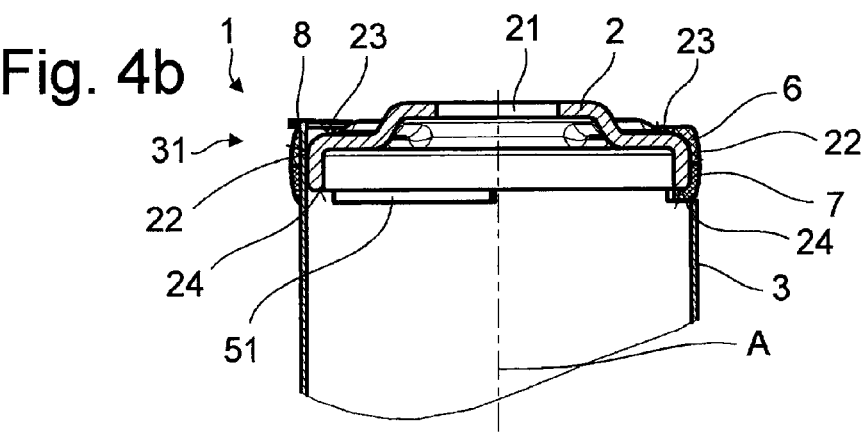
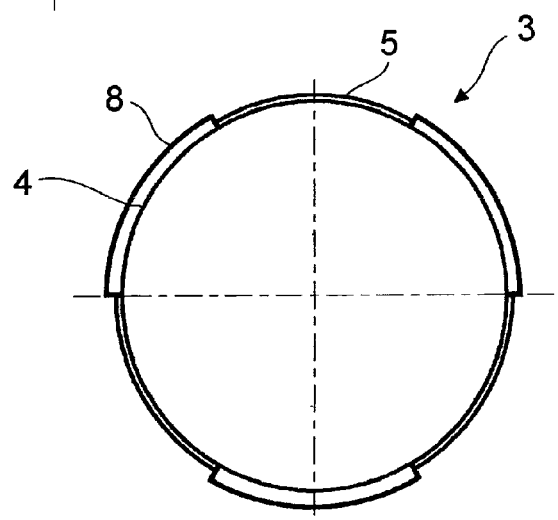

PROTECTIVE TUBE ARRANGEMENT FOR A PISTON-CYLINDER UNIT HAVING A PISTON ROD

BACKGROUND OF THE INVENTION

1. Field of the Invention

The present invention is directed to a protective tube arrangement for a piston-cylinder unit having a piston rod.

2. Background of the Invention

A piston-cylinder unit having a protective tube arrangement of the generic type is sufficiently well known and is used, for example, as a suspension strut in the automotive industry.

Generally, the piston-cylinder unit comprises a working cylinder which is filled with a working medium and a piston rod which is fixed at least indirectly to a piston and which is axially guided in the working cylinder. To prevent the escape of working medium out of the interior of the cylinder, the piston rod is sealed radially relative to the working cylinder by means of a piston rod seal; this piston rod seal radially encloses the piston rod and presses against the piston rod, and the outer circumferential surface of the piston rod seal presses against the inner wall of the working cylinder. The piston rod which is fixed to the piston moves into or out of the working cylinder depending upon the direction of the axial piston movements. To reduce the friction occurring between the piston rod and the piston rod seal, the surface of the piston rod is optimized to achieve a defined surface finish quality. It is important to protect the piston rod against possible damage caused by shocks or soiling because otherwise the piston rod seal is irreparably damaged by scratches and contamination of the piston rod surface.

A protective tube which is at least indirectly fixed to the exit-side end of the piston rod and which at least partially encloses the piston rod so as to form a radial clearance is commonly used to protect the piston rod. In doing so, the protective tube covers the portion of the piston rod extending out of the working cylinder in every state of the suspension.

A protective tube made of steel is commonly pressed on or welded to the carrying cap which is fixed to the piston rod.

It is likewise known to use a tube made of plastic. The low weight of a protective tube made of plastic is considered particularly advantageous. Apart from this, a plastic protective tube is highly resistant to corrosion so that additional varnishing of the protective tube can be dispensed with.

DE 1 951 753 U discloses a protective tube made of plastic in which the inner surface thereof has an inclined surface which narrows conically in direction of the cover plate and which terminates by an annular groove at the end of the protective tube. The connection of the protective tube to the carrying cap secured to the piston rod is carried out by pulling the protective tube over the carrying cap which accordingly slides along the inclined surface and locks into the annular groove.

However, the special shape of the protective tube cannot be produced without substantial expenditure. Further, the production of the protective tube requires a high precision because if the annular groove is made too deep and/or too wide the connection will exhibit play between the protective tube and carrying cap. If underdimensioned, the carrying cap made of metal can destroy the protective tube made of plastic when pulled on.

DE 1 995 281 U discloses a protective tube which is made of plastic and which has at least one thermally formed annular constriction by which it is fastened to the carrying cap. The constriction can be generated during the assembly process, for example, by means of thermoelectric pincers.

However, this method can only be realized in case of protective tubes which are produced from thermoplastics, which severely limits the range of possible materials for producing a protective tube.

It is an object of the present invention to develop a fastening of the protective tube to the carrying cap which can be produced in the simplest and most economical way possible and which is suitable for protective tubes produced from thermoplastics and duroplasts or metal and which solves the problems mentioned above.

SUMMARY OF THE INVENTION

According to the present invention, this object is met by providing a protective tube arrangement for a piston-cylinder unit having a piston rod which provides that the protective tube has axially projecting crenellations in the contact region thereof, wherein free portions are formed between the crenellations, and the protective tube arrangement has a first axially acting securing element and a second axially acting securing element which axially fix the protective tube to the carrying cap by positive engagement, each of the securing element is formed by a wrapped binding element which is wrapped around the protective tube over the crenellations in the contact region of the protective tube and tightened between the crenellations over the free portions so that the binding element defines secant segments through the indentation of the imaginary contour of the protective tube between the crenellations in the free portions of the protective tube, which secant segments form a positively engaging arrangement for the carrying cap.

This forms a simple, secure and economical fastening of the protective tube to the carrying cap which is suitable for protective tubes which can be constructed from a very wide assortment of materials. A fastening according to the invention can be realized for protective tubes produced from a thermoplastic as well as for protective tubes produced from a duroplast. Further, this makes it possible to fasten a protective tube made of metal to a carrying cap without welding, which is very advantageous, e.g., when using a light metal such as aluminum, because a thin-walled protective tube manufactured from aluminum pipe cannot be welded to the carrying cap without the use of very expensive installations.

According to an advantageous embodiment, the binding element used for forming the axially acting securing element is made from a fiber-plastic composite. In so doing, a roving is immersed in a matrix substance, as it is called, and is then wrapped around the protective tube in the manner as per the present invention. A plastic which has been changed into a liquid aggregate state and which enters into a firmly bonding connection with the protective tube when cured can be used as matrix. In this way, the axially acting securing element is permanently connected to the protective tube, which affords great advantages as regards strength.

In another advantageous embodiment of the protective tube arrangement according to the present invention, the binding elements used for forming the axially acting securing element is constructed from a wire. In this way, production costs can be lowered substantially and the strength of the fastening can be increased.

It can be quite useful to construct the first axially acting securing element and the second axially acting securing element from different materials. In this way, different properties of the different materials can be combined at will.

According to another advantageous embodiment, the crenellations have at least one radial protuberance which is formed in the area of the free axial ends of the crenellations, and the latter extend radially outward in direction of the axially acting securing element. The axial extension of the axially acting securing element can be defined by this protuberance. Further, axial displacement of the axially acting securing element at the protective tube can be prevented in this way.

The protective tube arrangement according to the invention can be produced by the present method.

In a first step, a die is inserted axially into the protective tube, which is clamped in a wrapping machine, from the side that is located opposite the contact region of the protective tube up to the position provided in the contact region of the protective tube for the carrying cap. The front side of the die is shaped in such a way that it substantially corresponds to the shape of the carrying cap in the region of the radial contact surface and of one of the axial contact surfaces.

In a second step, a first axially acting securing element is wrapped around the protective tube over a first length portion of the crenellations in the area of the free axial ends of the crenellations, the crenellations are only partially axially covered by the first securing element, and the securing element is positioned at the inserted die between the crenellations in the free portions.

When a binding element made of fiber-plastic composite is used for producing the first axially acting securing element, it is useful to provide a curing process after wrapping. On the other hand, when a wire is used to form the first axially acting securing element, a curing process can be dispensed with.

Because of the shape of the die which substantially corresponds to the shape of the carrying cap in the area of the radial contact surface and of one of the axial contact surfaces, a female mold is formed for the arrangement of the corresponding axial contact surface of the carrying cap.

In a third step, the die is removed from the protective tube and is replaced by the carrying cap; the latter axially contacts the female mold defined by the first axially acting securing element in positive engagement. The carrying cap is dimensioned in such a way and the axial position of the carrying cap in the protective tube is selected in such a way that an axial engagement gap is provided between the axial end of the carrying cap and the protective tube in at least one free portion.

In a fourth step, a second binding element is wrapped around the protective tube over the rest of the axial length portion of the crenellations that is not covered by the first axially acting securing element; this second binding element contacts the axially free end of the inserted carrying cap in the free portions through the engagement gap.

This results in a permanent positive engagement connection between the carrying cap and protective tube at the side of the carrying cap remote of the free ends of the crenellations.

When a binding element made of fiber-plastic composite is used for producing the second axially acting securing element, it is useful to provide a curing process after wrapping. On the other hand, when a wire is used to form the second axially acting securing element, a curing process can be dispensed with.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be described in more detail by way of example with reference to the following drawings in which:

FIG. 2c is a sectional view of a protective tube arrangement according to the present invention after the third step of the present method has been carried out;

FIG. 2d is a sectional view of a protective tube arrangement according to the invention after the fourth step of the present method has been carried out;

FIG. 4a is a sectional view of the protective tube according to the present invention having a radial protuberance formed at the crenellation;

FIG. 4b is a sectional view of the protective tube arrangement according to the present invention having a radial protuberance formed at the crenellation; and FIG. 4c is the protective tube according to the present invention having a radial protuberance formed at the crenellation, viewed from the top on the crenellation side.

DETAILED DESCRIPTION OF THE PRESENTLY PREFERRED EMBODIMENTS

FIGS. 1a, 1b, 2d and 4b show a protective tube arrangement 1 according to the invention for a piston-cylinder unit 11 having a piston rod 12. For the sake of simplicity, the position of the piston-cylinder unit 11 and piston rod 12 is only indicated by a dashed line in FIG. 1b.

Figure 1A:
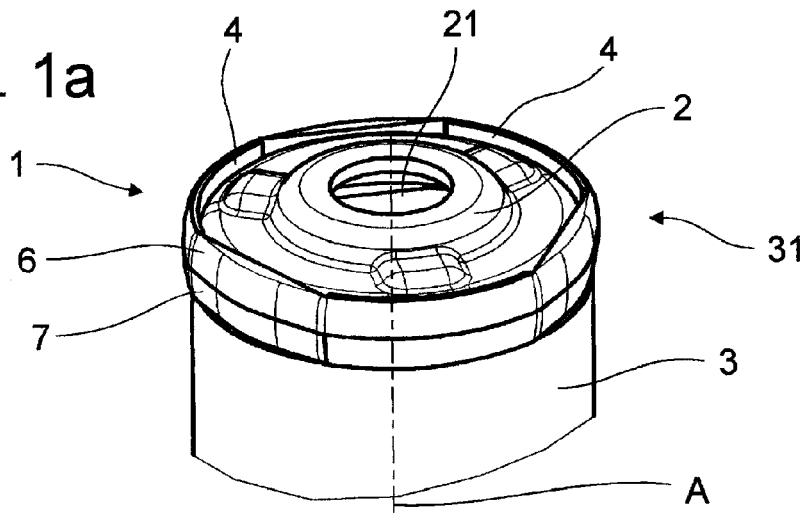
FIG. 1a is a perspective view of a protective tube arrangement according to the present invention.
Figure 1B:
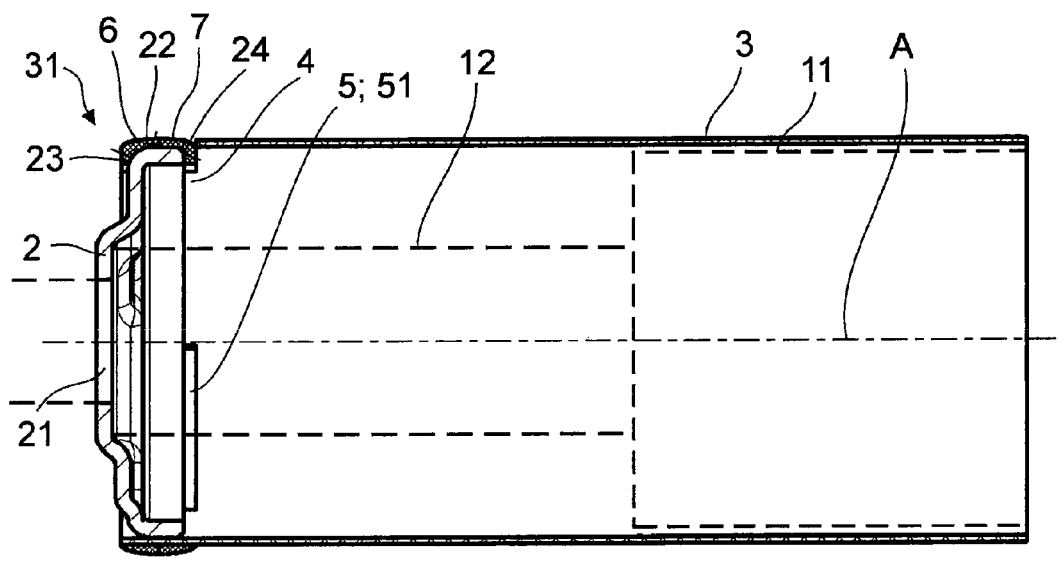
FIG. 1b is a sectional view of a protective tube arrangement according to the present invention.

FIGS. 1a and 1b show a protective tube arrangement 1 according to the invention. The illustrated protective tube arrangement 1 comprises a substantially disk-shaped carrying cap 2, a protective tube 3, a first axially acting securing element 6 and a second axially acting securing element 7. The carrying cap 2 shown in FIGS. 1a, 1b, 2c, 2d and 4b is angled in its radially outer circumferential area, which makes it possible to use a relatively thin plate for producing the carrying cap 2. This saves on weight and increases the stability of the carrying cap. Of course, a disk-shaped carrying cap 2 with two parallel base areas and without an angled edge can also be used for producing the protective tube arrangement 1 according to the invention.

The carrying cap 2 has a fastening aperture 21 for receiving a piston rod 12. Further, the carrying cap 2 has a radial contact surface 22 extending at least partially along the circumferential area. This contact surface 22 is limited by a first axial contact surface 23 and a second axial contact surface 24. The axial contact surfaces 23; 24 are located in each instance at one side of the carrying cap 2 and extend over the carrying cap 2 radially with reference to a longitudinal axis A of the protective tube arrangement 1.

Further, the protective tube arrangement 1 according to the invention has a protective tube 3 which at least partially encloses the piston rod 12 while forming a radial free space therebetween. The protective tube 3 has at one end a contact region 31 for the arrangement of the protective tube 3 at the carrying cap 2.

The carrying cap 2 is inserted into the protective tube 3 and contacts the protective tube 3 at the radial contact surface 22 of the carrying cap 2 in the contact region 31 of the protective tube 3.

As can also be seen from FIGS. 1a to 1b, the protective tube 3 has in the contact region 31 thereof axially projecting crenellations 4, free portions 5 being formed between the crenellations 4.

The carrying cap 2 inserted into the protective tube 3 is connected by positive engagement to the protective tube by means of a first axially acting securing element 6 and a second axially acting securing element 7. The two axially acting securing elements 6, 7 are formed in each instance by a wrapped binding element which is wrapped around the protective tube 3 over the crenellations 4 in the contact region 31 thereof and tightened between the crenellations 4 and over the free portions 5. Accordingly, the binding element defines secant segments through the indentation of the imaginary contour of the protective tube between the crenellations 4 in the free portions 5 of the protective tube 3, which secant segments form a positively engaging arrangement 9 for the carrying cap 2. The positively engaging arrangement 9 can be seen particularly clearly in FIG. 2b.

Figure 2A:
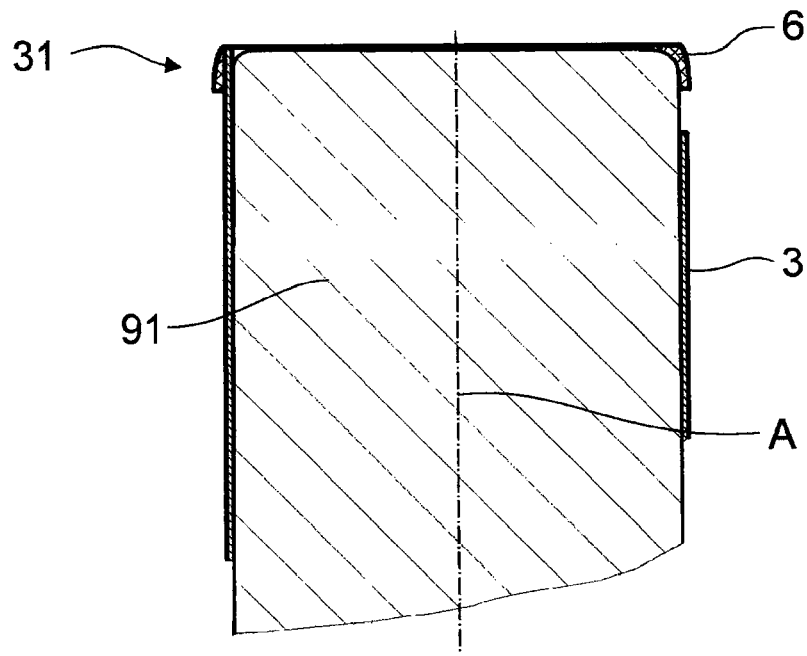
FIG. 2a is a sectional view of a protective tube arrangement according to the invention after the first step of the present method has been carried out.

As is illustrated in FIG. 2a, a die 91 is inserted axially into the protective tube 3, which is clamped in a wrapping machine, not shown, from the side opposite the contact region 31 of the protective tube 3 up to the position provided for the carrying cap 2 in the contact region 31 of the protective tube 3. The front side of the die 91 is shaped in such a way that it substantially corresponds to the shape of the carrying cap 2 in the region of the radial contact surface 22 and one of the axial contact surfaces 23, 24.

FIG. 2a further shows that the first axially acting securing element 6 has been wrapped around the protective tube 3 over the crenellations 4 in the region of the free axial ends of the crenellations 4; the crenellations 4 are only partially axially covered by the first axially acting securing element 6, and the securing element 6 contacts the inserted die 91 between the crenellations 4 in the free portions 5.

Figure 2B:
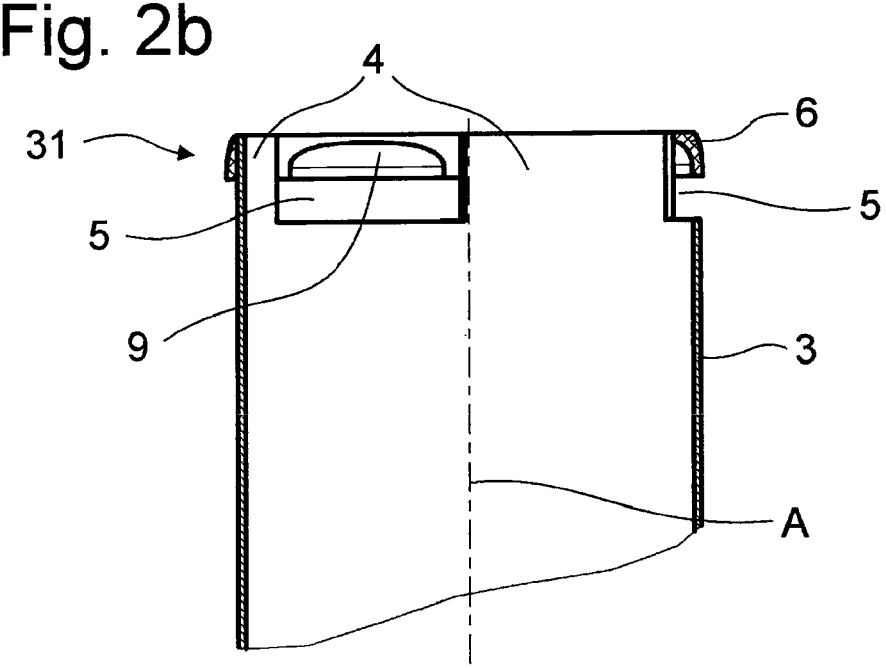
FIG. 2b is a sectional view of a protective tube arrangement according to the invention after the second step of the present method has been carried out.

FIG. 2b shows the protective tube arrangement 1 according to the invention after the die 91 has been removed from the protective tube 3. By means of the steps described above, a female mold was formed for applying the corresponding axial contact surface 23, 24 of the carrying cap 2. It can also be clearly seen in this case that the first axially acting securing element 6 is wrapped around the protective tube 3 over the crenellations 4 in the area of the free axial ends of the crenellations 4. The crenellations 4 are only partially axially covered by the first axially acting securing element 6. Further, the positively engaging contact 9 which is formed for the carrying cap 2 in the free portions 5 can be seen between the crenellations 4. It is assumed that a curing process was provided after wrapping on the first axially acting securing element 6 when a binding element constructed of fiber-plastic composite is used for producing the first axially acting securing element 6. However, if a wire had been used to form the first axially acting securing element 6, a curing process would not have been necessary.

It can be seen in FIG. 2c that the carrying cap 2 is introduced into the protective tube 3, wherein the carrying cap 2 axially contacts the arrangement 9 defined by the first axially acting securing element 6 in a positive engagement. Further, it can be clearly seen that an axial engagement gap 51 is provided in the free portion between the crenellations 4 between the axially free end of the carrying cap 2 and the protective tube 3.

FIG. 2d shows a protective tube arrangement 1 according to the invention which is produced according to the present method. It can be seen that the second axially acting securing element 7 is wrapped around the protective tube 3 over the free surface of the crenellations 4, i.e., the surface that is not covered by the first axially acting securing element 6. The second axially acting securing element 7 contacts the axially free end of the carrying cap 2 in the free portions 5 through the engagement gap 51.

Accordingly, a positive engagement connection of the carrying cap 2, protective tube 3 and axially acting securing elements 6, 7 is produced in a simple manner.

If a binding element made of fiber-plastic composite was used for producing the second axially acting securing element 7, it was useful in this case to provide a curing process after wrapping. On the other hand, when a wire is used to form the second axially acting securing element 7, a curing process can be dispensed with.

Figure 3A:
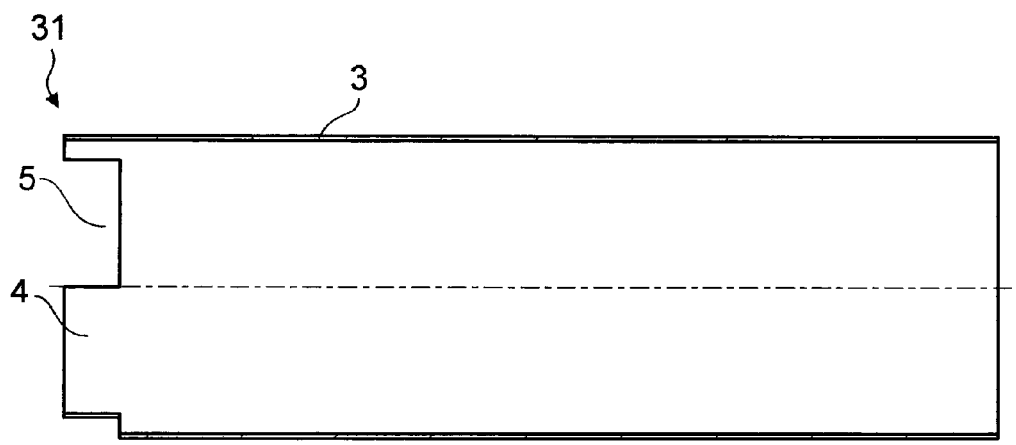
FIG. 3a is a sectional view of the protective tube according to the present invention.
Figure 3B:
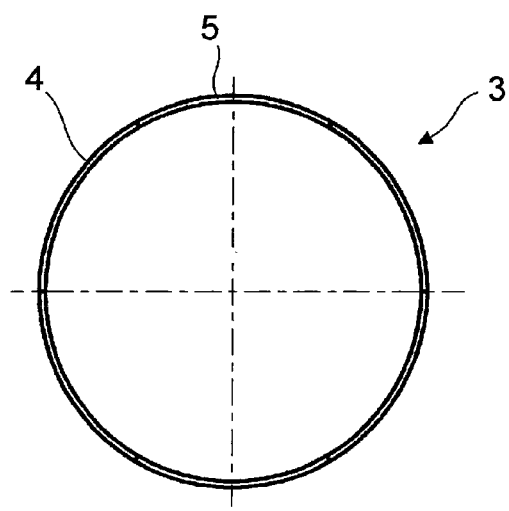
FIG. 3b is a top view of the protective tube according to the invention on the crenellation side.

FIGS. 3a and 3b show two views of the protective tube 3. FIG. 3a shows a protective tube 3 according to the invention having axially projecting crenellations 4 at one end, free portions 5 being formed between the crenellations 4. The contact region 31 formed at the end of the protective tube 3 provided with the crenellations 4 for arranging the protective tube 3 at the carrying cap 2 can be seen especially clearly here.

FIG. 3b shows an example of how the crenellations 4 and the free portions 5 can be formed at the protective tube.

In addition to the features of the protective tube arrangement according to the invention which are already known from the other drawings, FIGS. 4a, 4b and 4c show that the crenellations 4 have at least one radial protuberance 8 which is formed in the region of the free axial ends of the crenellations 4 and extends radially outward in direction of the axially acting securing element 6.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A protective tube arrangement for a piston-cylinder unit comprising:
   a piston rod (12);
   a substantially disk-shaped carrying cap (2) having a fastening aperture (21) for receiving said piston rod (12), said disc-shaped carrying cap (2) further having a circumferential area and a radial contact surface (22) extending at least partially along said circumferential area;
a first axial contact surface (23) and a second axial contact surface (24) limiting said radial contact surface (22);
each of said axial contact surfaces being located at one side of said carrying cap (2) and extending at least partially over said carrying cap (2) radially with reference to a longitudinal axis (A) of said protective tube arrangement;
a protective tube (3) at least partially enclosing said piston rod (12) and forming a radial free space, said protective tube (3) comprising at one end a contact region (31) for contacting said protective tube (3) at said carrying cap (2);
said carrying cap (2) being inserted into said protective tube (3) and contacting said protective tube (3) at said radial contact surface (22) of said carrying cap (2) in said contact region (31) of said protective tube (3);
said protective tube (3) further comprising a plurality of axially projecting crenellations (4) in said contact region (31) of said protective tube (3) and free portions (5) formed between said crenellations (4);
said protective tube arrangement further comprising a first axially acting securing element (6) and a second axially acting securing element (7) for axially fixing said protective tube (3) to said carrying cap (2) by positive engagement, each of said securing elements (6, 7) formed by a wrapped binding element wrapped around said protective tube (3) over said crenellations in said contact region (31) of said protective tube and tightened between said crenellations (4) over said free portions (5) so that said binding element defines secant segments through indentation of a contour of said protective tube (3) between said crenellations (4) in said free portions of said protective tube (3), said secant segments forming a positively engaging arrangement (9) for said carrying cap (2).

2. The protective tube arrangement for a piston-cylinder unit according to claim 1, wherein said axially acting securing elements (6, 7) are made from a fiber-plastic composite.

3. The protective tube arrangement for a piston-cylinder unit according to claim 1, wherein said axially acting securing elements (6, 7) are constructed from a wire.

4. The protective tube arrangement for a piston-cylinder unit according to claim 1, wherein said first axially acting securing element (6) and said second axially acting securing element (7) are made from different materials.

5. The protective tube arrangement for a piston-cylinder unit according to claim 1, wherein said crenellations (4) comprise at least one radial protuberance (8) formed in the area of the free axial ends of said crenellations (4), said protuberance extending radially outward in direction of said axially acting securing elements (6, 7).

6. A method of producing a protective tube arrangement (1) for a piston-cylinder unit (11) having a piston rod (12) according to claim 1, said method comprising:
in a first step, inserting a die (91) axially into the protective tube (3), which is clamped in a wrapping machine, from the side that is located opposite the contact region (31) of the protective tube (3) up to the position provided in the contact region (31) of the protective tube (3) for the carrying cap (2), wherein the front side of the die (91) is shaped in such a way that it substantially corresponds to the shape of the carrying cap (2) in the region of the radial contact surface (22) and of one of the axial contact surfaces (23, 24);
in a second step, wrapping a first axially acting securing element (6) around the protective tube (3) over the crenellations (4) in the area of the free axial ends of the crenellations (4), wherein the crenellations (4) are only partially axially covered by the first securing element (6), and wherein the securing element (6) is positioned at the inserted die (91) between the crenellations (4) in the free portions (5) so that a female mold is formed for the arrangement of the corresponding axial contact surfaces (23, 24) of the carrying cap (2);
in a third step, removing the die (91) from the protective tube (3) and replacing the die by the carrying cap (2), wherein the carrying cap axially contacts the female mold defined by the first axially acting securing element (6) in positive engagement, wherein an axial engagement gap (51) is provided between the second axial contact surface of the carrying cap (2) and the protective tube (3) in the free portion (5) between the crenellations (4); and
in a fourth step, wrapping the second axially acting securing element (7) around the protective tube (3) over the free surface of the crenellations (4) wherein the second axially acting securing element (7) contacts the second axial contact surface of the inserted carrying cap (2) in the free portions (5) through the engagement gap (51).

7. The method of producing a protective tube arrangement (1) for a piston-cylinder unit (11) having a piston rod (12) according to claim 6, additionally providing a curing process for the axially acting securing elements (6, 7) between the second step and the third step.

8. The method of producing a protective tube arrangement (1) for a piston-cylinder unit (11) having a piston rod (12) according to claim 6, additionally providing a curing process for the axially acting securing elements (6, 7) after the fourth step.

9. The method of producing a protective tube arrangement (1) for a piston-cylinder unit (11) having a piston rod (12) according to claim 7, additionally providing a curing process for the axially acting securing elements (6, 7) after the fourth step.

10. The protective tube arrangement for a piston-cylinder unit according to claim 2, wherein said first axially acting securing element (6) and said second axially acting securing element (7) are made from different materials.

11. The protective tube arrangement for a piston-cylinder unit according to claim 3, wherein said first axially acting securing element (6) and said second axially acting securing element (7) are made from different materials.

12. The protective tube arrangement for a piston-cylinder unit according to claim 2, wherein said crenellations (4) comprise at least one radial protuberance (8) formed in the area of the free axial ends of said crenellations (4), said protuberance extending radially outward in direction of said axially acting securing elements (6, 7).

13. The protective tube arrangement for a piston-cylinder unit according to claim 3, wherein said crenellations (4) comprise at least one radial protuberance (8) formed in the area of the free axial ends of said crenellations (4), said protuberance extending radially outward in direction of said axially acting securing elements (6, 7).

14. The protective tube arrangement for a piston-cylinder unit according to claim 4, wherein said crenellations (4) comprise at least one radial protuberance (8) formed in the area of the free axial ends of said crenellations (4), said protuberance extending radially outward in direction of said axially acting securing elements (6, 7).

* * * * *